(12) United States Patent
van den Berg

(10) Patent No.: US 6,323,033 B1
(45) Date of Patent: *Nov. 27, 2001

(54) METHOD AND APPARATUS FOR CLEANING A MILK LINE SYSTEM

(75) Inventor: Karel van den Berg, Bleskensgraaf (NL)

(73) Assignee: Maasland N,V, (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,517

(22) Filed: Sep. 4, 1996

(30) Foreign Application Priority Data

Sep. 8, 1995 (NL) .................................................. 1001158

(51) Int. Cl.⁷ ............................ G01N 33/04; G01N 27/04
(52) U.S. Cl. .............................. 436/23; 205/787; 134/18; 134/22.11
(58) Field of Search .................................. 134/18, 22.11, 134/22.12, 10, 22.13, 22.17, 25.3, 26, 42; 205/787; 436/23

(56) References Cited

U.S. PATENT DOCUMENTS

| | | | |
|---|---|---|---|
| 2,818,075 | * | 6/1957 | Erling .................................... 134/102 |
| 3,191,576 | * | 6/1965 | Bender ............................... 119/14.07 |
| 3,417,763 | * | 12/1968 | Fjermestad et al. ................ 134/58 R |
| 3,762,874 | * | 10/1973 | Berry ..................................... 422/28 |
| 4,015,618 | | 4/1977 | Schmid .................................. 137/93 |
| 4,515,641 | * | 5/1985 | Juenger .................................... 134/5 |
| 4,848,381 | * | 7/1989 | Livingston et al. ............... 134/57 R |
| 5,091,306 | * | 2/1992 | Citri ....................................... 436/23 |
| 5,370,743 | * | 12/1994 | Usui et al. ............................. 134/18 |
| 5,521,510 | * | 5/1996 | Schunck et al. ..................... 205/787 |

FOREIGN PATENT DOCUMENTS

| | | | |
|---|---|---|---|
| 4208066 A1 | | 9/1992 | (DE) . |
| 4403141 A1 | | 8/1995 | (DE) . |
| 4134549 | * | 4/1993 | (DE) ...................................... 436/23 |

\* cited by examiner

*Primary Examiner*—Jill Warden
*Assistant Examiner*—Saeed Chaudhry
(74) *Attorney, Agent, or Firm*—Penrose Lucas Albright

(57) ABSTRACT

The invention relates to a method of determining the extent to which a milk line system is rinsed with a cleaning fluid, whereby in one or more places in the milk line system the electric conductivity of the cleaning fluid is determined. More in particular, according to the invention, the electric conductivity is measured in places which are difficult to reach for the cleaning fluid and/or in places in the milk line system which are more susceptible to contamination.

5 Claims, 1 Drawing Sheet

METHOD AND APPARATUS FOR CLEANING A MILK LINE SYSTEM

FIELD OF THE INVENTION

The invention relates to a dairy farm method of cleaning a milk line system of a milking apparatus. In particular, the invention relates to methods and apparatus for cleaning a milk line system wherein the animals are milked automatically by milking robots.

BACKGROUND OF THE INVENTION

In such apparatus the milk line system has to be periodically cleaned to prevent milk discharged by the milk line system from being contaminated and hence from deteriorating. In the conventional milking machines, the line system is cleaned after the herd has been milked. In the case of automatic milking by milking robots, the milk line system is cleaned after a certain period of time has elapsed or a predetermined number of animals has been milked. The milk line system may also be cleaned when it has been ascertained that milk produced by an animal which is infected with mastitis or another condition that adversely affects its milk is discharged by the line.

The cleaning of the milk line system is divided into three phases, the pre-rinsing, the main cleaning and the post-rinsing. The pre-rinsing serves to remove the milk residues as much as possible from the system prior to the main cleaning. Consequently, the main cleaning will require less detergent. In order to achieve this, the pre-rinsing should not be a circulation rinsing. For the pre-rinsing the temperature of the water is 40° to maximum of 60° C. (104° F.–140° F.). The pre-rinsing is succeeded by the main cleaning. The main cleaning serves to clean and disinfect the equipment. This is realized by circulating a cleaning fluid. The cleaning is mostly effected with an alkali having a cleaning or disinfecting function or both. In order to avoid formation of scale in the milk line system, said system has also to be cleaned from time to time with an acid. With the acid, scale formed in the milk line system, such as on the electrodes of a milk conductivity sensor, can be dissolved and thus removed from the milk line system. After the main cleaning, the milk line system has to be cleaned by means of post-rinsing. This is to prevent residues of the cleaning fluid from coming into the milk. The post-rinsing is effected with tap water. The post-rinsing water should preferably not circulate.

In practice it has been found that mistakes occur during cleaning of the milk production equipment, as a result of which this equipment is cleaned insufficiently and consequently the germ count of the milk more than doubles. This may be caused by an insufficient quantity of alkali or acid, or by insufficient post-rinsing, or by the fact that certain places are not reached by the cleaning fluid, because a tube is pinched off, etc.

SUMMARY OF THE INVENTION

The invention aims at providing a method, in which the above-mentioned drawbacks do not occur or are at least limited to a considerable extent.

In accordance with the invention, this is achieved by means of a method of determining the extent to which a milk line system is rinsed with a cleaning fluid, whereby in one or more places in the milk line system the electric conductivity of the cleaning fluid is measured to determine its purity. In this manner, it can be verified that the milk line system has been cleaned adequately. This verification thus avoids an insufficient cleaning of the milk line system and the resulting increased germ count in the milk.

A method in accordance with the invention is that in places which are difficult to reach for the cleaning fluid or in places in the milk line system which are more likely to cause contamination, the electric conductivity of the cleaning fluid is measured.

According to a further method of the invention, the electric conductivity is measured in a line connected to a teat cup. In practice this place has been found susceptible to being contaminated and difficult to reach.

According to a further inventive feature, on the basis of the results of the electric conductivity measuring, the concentration of the solvent present in the cleaning fluid is determined. Thus on the basis of the measuring results it can be checked whether the concentration of solvent in the cleaning fluid is insufficient or excessive. The solvent added to the cleaning fluid is preferably an acid or an alkali. According to a further inventive feature, the concentration of alkali or the concentration of acid in the cleaning fluid is determined. According to again another inventive feature, after the concentration of alkali or acid has been determined, this concentration is compared with a predetermined value for the concentration of alkali/acid and, when said value is not reached, alkali or acid is added to the cleaning fluid until the relevant value has been reached. If this value is exceeded, cleaning fluid is added until the predetermined value has been reached. The correct concentration of the detergent is important for a proper cleaning, for a lower quantity than optimum decreases the cleaning function, whereas a higher quantity results in an unnecessarily high consumption of the detergent and burdens the environment.

According to still another inventive feature, there is applied a method in which, after the milk line system has been rinsed with a cleaning fluid, the milk line system is post-rinsed with a post-rinsing fluid and, during post-rinsing, the concentration of alkali or acid in the milk line system is determined and compared with a predetermined minimum value for the concentration of alkali or acid, and the post-rinsing of the milk line system is only ended when an acceptable minimum value has been reached. In this manner, residues of the cleaning fluid are prevented from mixing with the milk and affecting the quality thereof.

The invention also relates to a method characterized in that the milk line system is rinsed with a calibration fluid containing a known concentration of alkali or acid and that this calibration value is compared with the value of the concentration of alkali or acid measured in the milk line system and that, when the measured value deviates from the calibration value, the means by which the electric conductivity of the fluid is measured are calibrated. In practice it has appeared that the afore-mentioned means show deviations after a period of use. These deviations are caused for example by substances present in the milk, which deposit on the means and which, during cleaning, are unsufficiently removed. Wear of the means may also occur. By calibrating the means contamination measuring, it is possible to continue obtaining reliable measurements from such means.

The invention furthermore relates to the apparatus for applying a method as mentioned above, whereby the apparatus comprises a milk line system with one or more milk conductivity sensors included therein. In practice these milk conductivity sensors are also used for checking the milk for mastitis etc. Thus, in the present invention, milk conductivity sensors known per se are further utilized for another application, that is, for checking the extent the milk line system is cleaned.

In accordance with a further inventive feature, the implement comprises a milk line system in which one or more teat cups are included. According to another inventive feature, there is disposed a milk conductivity sensor in the milk line of a teat cup. In a preferred embodiment according to the invention, each milk line that is connected to a teat cup is provided with a milk conductivity sensor. In this manner an optimal check of the cleaning of the milk lines of the teat cups can be obtained. In accordance with still another inventive feature, the apparatus in which the invention is employed comprises a milking robot for automatically connecting teat cups to the teats of an animal and respectively disconnecting same therefrom. The application of a method as described above in such an apparatus including a milking robot and a milk line system is exceedingly advantageous, because the milking robot operates automatically for long periods of time without the presence and direct supervision of an operating person and hence the cleaning of the milk line system is checked in the absence of an operating person.

It will be clear that the above mentioned methods of determining the extent to which a milk line system is rinsed with a cleaning fluid are also applicable to a line system with a fluid other than milk. The invention therefore also relates to a method of determining the extent to which line system is rinsed with a cleaning fluid, whereby in one or more places in the line system the electric conductivity of the cleaning fluid is measured, after which the purity of the cleaning fluid is determined.

BRIEF DESCRIPTION OF THE DRAWING

For a better understanding of the invention and to show how the same may be carried into effect, reference will now be made, by way of example, to an embodiment as represented in the accompanying FIG. 1, in which an apparatus for automatically milking animals is shown schematically, whereby only those parts of the apparatus are represented that are considered of importance for the understanding of the invention. It will be obvious however, that the invention is not restricted to the embodiment shown and described herein; it only serves to illustrate the inventive concept.

DESCRIPTION ON THE PREFERRED EMBODIMENT

Figure 1:
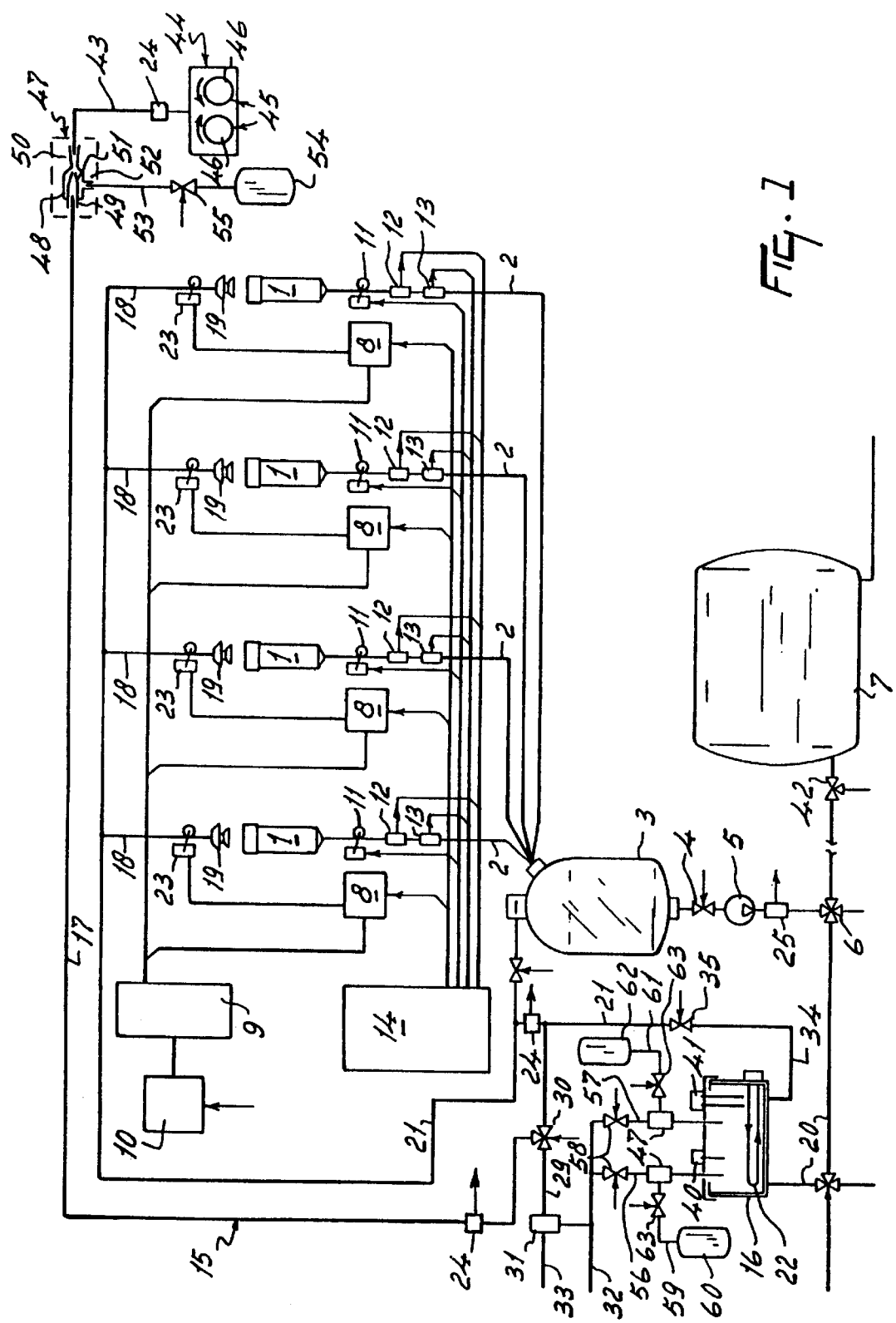

In the apparatus shown in FIG. 1 the teat cups are indicated by the reference numeral 1. These teat cups are each provided with a lining of flexible material, by means of which the teat space of a teat cup is separated from the pulsation space. By means of a milking robot (not shown), the teat cups 1 can automatically be connected to and removed from the teats of an animal. To the teat space of each of the teat cups 1 is connected a milk line 2. All milk lines 2 debouch into a milk glass 3. Via a valve 4, a pump 5 and a valve 6, the milk glass 3 is in communication with a milk tank 7. For each of the teat cups 1 there is available a pulsator 8, which, during milking, applies a pulsating vacuum stimulating the milk yield in the pulsation space of the relevant teat cup 1. Each of pulsators 8 is connected to a vacuum balance tank 9, in which, by means of a motor driven pump 10, a stabilized vacuum is generated. In each of milk lines 2 connected to teat cups 1 there are included consecutively a close-off element 11, a vacuum sensor 12 and a milk conductivity sensor 13. By means of milk conductivity sensor 13 the electric conductivity of the milk and a rinsing fluid can be determined. Furthermore the apparatus comprises a computer 14, by means of which the various parts of the apparatus for automatically milking are controlled. For the purpose of rinsing, the apparatus is provided with a rinsing circuit 15, constituted by a rinsing fluid tank 16, a rinsing fluid supply line 17, separate rinsing fluid supply lines 18, each of which is connected to the rinsing fluid line 17. The separate rinsing fluid supply lines 18 head to rinsing jetters 19 to which the teat cups 1 can be connected. In order to obtain a closed rinsing circuit, milk glass 3 is capable of being connected, via the valve 6 and a return line 20, to the rinsing fluid tank 16. By means of a rinsing fluid line 21 a shortened rinsing circuit is provided through milk glass 3. In the rinsing fluid line 21 there is further included a conductivity sensor 24, by means of which the electric conductivity of the rinsing fluid can also be determined. By means of a heating element 22 in rinsing fluid tank 16, water of preferably 40 to 60° C. (104° F.–140° F.) containing a detergent can be drawn by the vacuum in milk glass 3, via rinsing fluid supply line 17, separate rinsing fluid supply lines 18, rinsing jetters 19, teat cups 1 and milk lines 2. This rinsing fluid is then pumped back, via valve 4, by means of pump 5 and via valve 6, to the rinsing fluid tank 16. When the rinsing fluid is passed through the separate rinsing fluid supply lines 18, it may occur that the quantities of rinsing fluid, passing through the various teat cups, differ from each other to a considerable extent. Hence there is included a close-off element 23 in each rinsing fluid supply line 18. Each close-off element 23 is under control of a pulsator 8. The pulsators 8 can be controlled by computer 14 so that the close-off elements 23 connected to the relevant pulsators consecutively release and close off the rinsing fluid supply lines 18, whereby the rinsing fluid is passed, consecutively in time, through the respective teat cups 1. In order to optimize the rinsing of the teat cups, the temperature of the rinsing fluid is maintained as constant as possible during rinsing. For that purpose there is included a temperature sensor 25 in rinsing circuit 15. Said temperature sensor is in communication with computer 14, which controls heating element 22 in the rinsing tank.

In the apparatus, there is moreover connected to the rinsing fluid supply line 17 a first supply line 29 for rinsing fluid, such as water. Included in first supply line 29 is a computer-controlled valve 30. In order to be able to control the temperature of the rinsing fluid, the first supply line 29 includes a thermostatically controlled tap 31, to which a hot water line 32 and a cold water line 33 are connected. By means of computer 14, for the purpose of pre-rinsing the milk lines, the teat cups and the milk glass, the thermostatically controlled tap 31 is adjusted to a temperature of the rinsing fluid lying between 32 and 42° C. (90° F.–108° F.) and amounting preferably to approximately 37° C. (99° F.), and the computer-controlled valve 30 is opened for approximately five (5) to seven (7) minutes.

To the rinsing fluid line 17 there is furthermore connected a second supply line 34, extending via the rinsing fluid tank 16, for a further rinsing fluid. The second supply line 34 also comprises a valve 35 controlled by computer 14.

The rinsing fluid tank 16 comprises a heating element 22, controlled by a thermostat 40, by means of which the water can be heated to a temperature of approximately 78° C.(172°F.), which temperature is very suitable for heat cleaning. In order to prevent the rinsing fluid tank 16 from boiling dry, said rinsing fluid tank comprises fluid level pins 41 supplying a signal to computer 14 when there is no water in the rinsing fluid tank 16 or the quantity of water therein is insufficient. Near milk glass 3, there is additionally included in the rinsing circuit a milk conductivity sensor 24, by means of which the electric conductivity of the rinsing fluid can be measured, which measurements are supplied to computer 14.

For discharging the rinsing fluid into the sewer, the rinsing circuit comprises two computer-controlled three-way valves 42.

The computer-controlled valve 30 is also designed as a three-way valve. To rinsing fluid line there is connected a further rinsing fluid line 43, by means of which rinsing fluid conveyed via the first supply line 29 can be supplied to a cleaning implement 44 for cleaning of cleaning elements 45, by means of which the udder or the teats or both of an animal are cleaned. In the further rinsing fluid line 43 there is also included a milk conductivity sensor 24. In the present embodiment, the cleaning elements 45 are designed as two spaced apart cleaning rollers 46, which, by means of a robot (not shown), can be brought under the animal's udder. During cleaning the teats are rubbed clean between the cleaning rollers 45 driven in opposite direction.

In the rinsing fluid line 43 there is further included a venturi-element 47. The venturi-element 47 comprises a cylindric housing 48 including a supply nipple 49 and a discharge nipple 50. The supply nipple 49 extends into the cylindric housing 48 until the discharge nipple 50 and has a tapering end part 51. To the cylindric housing 48 there is connected, by means of a further nipple 52 and a further line 53, a tank 54 containing disinfecting fluid, such as chlorite. In the further line 53 there is included a computer-controlled valve 55. When it is desirable to clean the cleaning elements 45 with a chlorite-water mixture, such a mixture can be obtained by opening the computer-controlled valve 55. The water flowing through the venturi-element 47 creates a vacuum in cylindric housing 48, so that the disinfecting fluid present in tank 54 is drawn into cylindric housing 48 and is mixed with the water. By means of the conductivity sensor 24 the concentration of the chlorite-water mixture can be checked.

Adding acid or alkali to the rinsing fluid tank 16 is effected in a similar way as adding disinfecting fluid to the rinsing fluid line 43. For that purpose the line 32 branches off into a first line 56 and a second line 57, both discharging fluid into the rinsing fluid tank 16. In the first line 56 and the second line 57 there is included a venturi-element 47, while in both lines 56 and 57 there are included computer-controlled valves 58. To the venturi-element 47 included in the first line 56 there is connected, via a line 59, a tank 60 containing an alkaline fluid, while to the venturi-element 47 included in the second line 57, there is connected, via a line 61, a tank 62 containing an acid. In the lines 59 and 61 there are furthermore included computer-controlled valves 63.

By means of the conductivity sensor 24, included in the rinsing fluid line 17, the conductivity of the rinsing fluid can be determined. Then, by means of the computer 14, the concentration of acid or alkali in the rinsing fluid can be determined. The concentration of acid or alkali in the rinsing fluid is also determined by means of the milk conductivity sensors 13, which, near the teat cups 1, are included in the milk lines 2.

Although I have described the preferred embodiment of my invention, it is to be understood that it is capable of other adaptations and modifications within the scope of the following claims.

Having disclosed my invention, what I claim as new and to be secured by Letters Patent of the United States is:

1. A method of testing at least two distinctive ionic conductive liquids flowing in a milk line system at different times comprising measuring the flow of electrical current between the same electrodes in said system when said liquid is milk to determine the wholesomeness of the milk and when the liquid is a rinsing fluid to determine the completeness of the rinsing process wherein said milk line system includes a plurality of teat cups, milk from each said teat cup being received in a separate milk line, said same electrodes comprising a pair of electrodes, respectively in each said milk line, each said pair of electrodes separately transmitting data to a computer as to the wholesomeness of milk in each corresponding said milk line during the milking operation and transmitting further data to said computer during a rinsing operation concerning the completeness of the rinsing process of each said milk line.

2. A method in accordance with claim 1, including the step of securing all but one of said milk lines during the rinsing operation so that only one of said milk lines is being rinsed at a time in succession.

3. A method in accordance with claim 1, comprising maintaining the temperature of said rinsing fluid at a constant temperature during the milking operation.

4. A method in accordance with claim 1, comprising the further step of controlling the temperature of said rinsing fluid so that its temperature is at a range of 40° C to 60° C.

5. A method in accordance with claim 1, comprising the further step of controlling the temperature of said rinsing fluid so it is at a temperature of approximately 78° C.

* * * * *